Oct. 28, 1930.                    H. ADAMS                    1,779,412
                               COAL FILLING CHUTE
                              Filed March 8, 1927
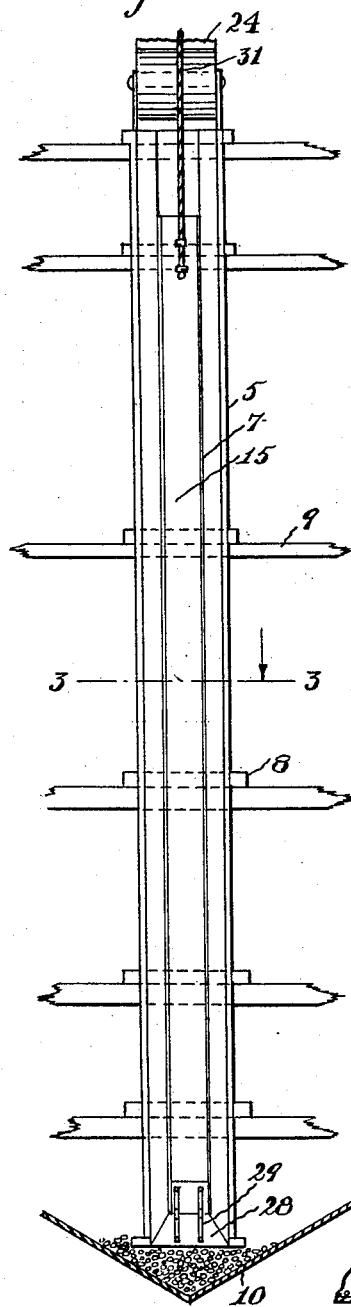
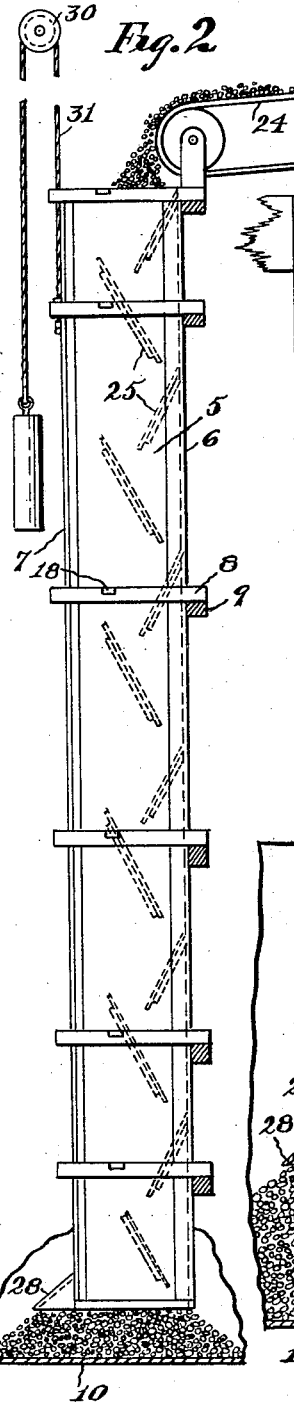
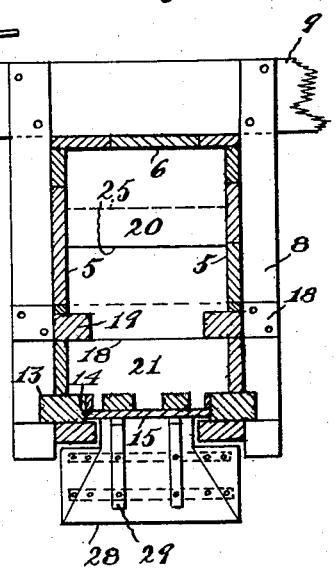
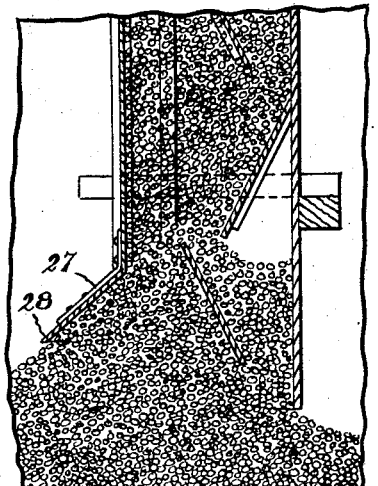
INVENTOR
Henry Adams,
BY Harold D. Penney
ATTORNEY Patented Oct. 28, 1930

1,779,412

UNITED STATES PATENT OFFICE

HENRY ADAMS, OF PLAINFIELD, NEW JERSEY, ASSIGNOR TO ADAMS COAL MACHINERY COMPANY, OF PLAINFIELD, NEW JERSEY, A CORPORATION OF CONNECTICUT

COAL-FILLING CHUTE

Application filed March 8, 1927. Serial No. 173,681.

This invention relates to methods and apparatus for loading coal and other friable material into cars, barges and the like, and more particularly to means for loading said materials in a way that degradation will be reduced to a minimum, though it is noted that the invention is not limited to fuels or friable materials, nor in some respects even to loading.

The object of the invention is to provide a method and apparatus of this kind which will load without letting the material fall any material distance, thereby reducing degradation to a minimum.

Another object of the invention is to provide an apparatus to carry out this method which is simple, inexpensive, and easy to operate.

Coal when loaded into cars or boats under most methods today is allowed to drop the distance from the loading chute down into the bottom of the boat, this fall causing excessive breakage.

Some loading plants are equipped with collapsible chutes which continually get out of order and are difficult to operate; other plants have a belt conveyor the end of which is lowered into the bottom of the boat. These are expensive to build and not easily operable, and have a drop of three feet more when coal leaves the end of the conveyor.

By using the method herein described, the chute employed may be simple and inexpensive, operates easily and reliably and requires no extra care to keep it in order, and if operated properly will not allow the material to fall any appreciable distance thereby reducing breakage to a minimum.

Another object of the invention is to provide an apparatus or device of this kind which will be substantially automatic in its action as the material piles up in the boat or the like.

Other objects of the invention are to improve generally the simplicity and efficiency of such apparatus and methods and to provide an apparatus of this kind which is rapid, durable and reliable in operation, and economical to construct.

Still other objects of the invention will appear as the description proceeds; and while herein details of the invention are described and claimed, the invention is not limited to these, since many and various changes may be made without departing from the scope of the invention as claimed in the broader claims.

The inventive features for the accomplishment of these and other objects are shown herein in connection with an improved filling or loading chute which, briefly stated, includes walls forming three permanently closed sides and an open side provided with a vertically slidable door extending approximately from top to bottom of the chute. Vertical bars on the inner face of the walls form barriers determining a division of said chute into an inner receiving and filling chute, having a lowering telegraph therein, and an outer discharge chute adjacent to said open side and freely communicating with the filling chute.

Counterbalancing means tend yieldably to raise said door with sufficiently great upward force to raise said door as the material in the chutes presses upon an outwardly and downwardly inclined apron secured to the lower part of said door, thereby to permit the material to pile up laterally.

With this apparatus I can perform a method for handling the material, comprising gradually lowering material in the filling chute until it spills into and fills the discharge column, and then releasing the material at the lower part of a side of the discharge column as the pressure therein increases to permit the material to pour out laterally after which the material is released progressively further up said side as the material piles up laterally.

In the accompanying drawing, showing by way of example, one of many possible embodiments of the invention, Fig. 1 is a fragmental front elevation showing the chute;

Fig. 2 is a side elevation of the chute;

Fig. 3 is a transverse horizontal sectional view, partly in plan, the section being taken on the line 3—3 of Fig. 1, looking in the direction of the arrows of said line; and Fig. 4 is a vertical sectional view showing the lower part of the chute and the material therein discharging.

My improved filling and loading chute comprises opposite side walls 5 and an intermediate rear wall 6 (Fig. 3) forming three permanently closed sides of the chute and providing a side 7 adapted at times to be substantially open from top to bottom of the chute. The opposite walls 5 include horizontal side pieces 8 rearwardly projecting beyond the rear walls and resting on supporting beams 9 secured to said rear wall and to the lower face of the side pieces for supporting the chute in a bin or boat a slight distance from the bottom 10 (Figs. 1 and 2) thereof.

Corner members 13 (Fig. 3) secured to the front corners of the chute at said open side are provided with opposed vertical slide way grooves 14 receiving a long narrow slide door 15 slidable in said grooves and extending approximately from top to bottom of the chute. Horizontal cross pieces 18 resting on said side pieces 8 and disposed across the chute from side wall to side wall parallel to the rear wall and near said open side support vertical bars 19 resting on said cross pieces and projecting from the inner face of the side walls and cooperating with the cross pieces to form barriers determining a division of said chute into an inner receiving or filling chute 20 (Fig. 3) of substantially square cross-section, and an outer discharge chute 21 of elongated horizontal cross section freely communicating with the filling chute between the barriers.

A suitable conveyor 24 (Fig. 2) or the like conveys material into the filling chute, discharging it into the upper end thereof upon downwardly and inwardly slanted separated staggered baffles 25 secured between said side walls 5 perpendicular thereto in vertical series to form a telegraph chute in said filling chute adjacent to the rear wall 6 but spaced from said slide door 15 and extending substantially from top to bottom of the receiving or filling chute 20. An intermediate part of each baffle is beneath and spaced from the lower edge of the baffle just above, thereby to form a flowage space between the baffles for lowering the material from said conveyor in a column from the top to the bottom of the filling chute, without excessive breakage, to permit the material to pile up, first beneath the chutes and then in the filling chute and to overflow between the barriers 18, 19 into the discharge chute 21, as long as material is supplied by the conveyor, until the major portion of the chutes is filled.

A rigidly disposed metal apron 28, reinforced with strips 29 of metal is secured to the lower part of said slide door 15 and is outwardly and downwardly inclined forwardly and laterally from the lower end of the door and adapted to be pressed upon with a lifting tendency by the material as the material fills said discharge chute 21. A pulley 30 above said door receives a flexible connecting means such as cable 31 secured to the top of the door and carrying a counterbalancing weight on its free end, said weight being of such a weight that the material when partially or nearly filling said chutes will press outwardly upon the apron 28 with a sufficiently great upward component to raise said door as the material continues to be fed to the chutes and pour out at said open side and pile up as the slide door is thus raised.

The coal or other material is delivered to the receiving chute 20 by the conveyor 24 or other suitable means and is baffled and retarded and gradually lowered in zig-zag fashion by the baffles 25 in the vertical filling chute 20 opening at one side into the discharge chute 21. As the chute 20 fills up from the bottom the material spills at said side into the chute 21 which confines the material as it spills and causes it to pile up in an adjacent discharge column in free communication with said filling column.

Pressure of the material on the apron 28 causes the releasing of the material at the lower part of the side of the discharge column when the pressure therein sufficiently increases and this permits the material to move laterally and pile up exteriorly of the chute. As the chute 21 continues to fill up the pressure causes the continued rise of the apron and the releasing of the material progressively further up said side of the discharge chute as said pressure increases to permit the material to further pile up exteriorly and fill the boat.

The action above described is automatic; but if desired, the door 15 may be raised by power, as for instance hand power, applied to the rope 31 or pulley 30, though it is noted that the invention is not limited to hand power rather than motor power or the automatic action above described.

I claim as my invention:

1. A vertical filling and discharge chute comprising opposite side walls and an intermediate rear wall forming three permanently closed sides of the chute and providing a side adapted at times to be substantially open from top to bottom of the chute; said opposite walls including horizontal side pieces rearwardly projecting beyond the rear walls; supporting beams secured to said rear wall and to the lower face of the side pieces for supporting the chute in a bin or boat a slight distance from the bottom thereof; corner members secured to the corners of the chute at said open side and provided with opposed vertical slide way grooves; a long arrow slide door slidable in said grooves and extending approximately from top to bottom of the chute; vertical barriers determining a division of said chute into a filling chute and a discharge chute adjacent to the open side and communicating with the filling chute throughout; and baffles in the filling chute.

2. An upright chute having an open side; a vertically slidable door in said open side; and means actuated by pressure in the chute for raising the door.

3. A vertical chute having an open side; a vertically slidable slide door in said open side; vertical barriers determining a division of said chute into a filling chute and a discharge chute adjacent to the open side and communicating with the filling chute throughout; baffles in the filling chute; a rigidly disposed metal apron, reinforced with strips of metal, secured to the lower part of said slide door and outwardly and downwardly inclined forwardly and laterally from the lower end of the door and adapted to be pressed upon the material as the material fills said chute; a pulley above said door; a flexible connecting means secured to the top of the door and passed over the pulley; and a counterbalancing weight on the free end of the connecting means, said weight being of such a weight that the material when nearly filling said chutes will press outwardly upon the apron with a sufficiently great upward component to raise said door as the material continues to be fed to the chutes and to pour out at said open sides and pile at said open sides and pile up as the slide door raises.

4. An upright chute having an open side; a vertically slidable door in said open side; an outwardly and downwardly inclined apron secured to the lower part of said door; and means yieldably raising said door with a sufficiently great upward force to raise said door as the material in the chutes presses on the apron.

5. A vertical chute having side walls, an open side and a rear wall opposite said side; a vertically slidable door in said open side; horizontal cross pieces across the chute from side wall to side wall parallel to the rear wall, near said open side; vertical bars resting on said cross pieces and projecting from the inner face of the side walls and cooperating with the cross pieces to form barriers determining a division of said chute into an inner filling chute of substantially square cross section, and an outer discharge chute of elongated horizontal cross section freely communicating with the filling chute between the barriers; and a conveyor for conveying material into the filling chute and discharging it into the upper end thereof.

6. A filling chute having side walls, an open side and a rear wall opposite the open side; a vertically slidable door in said open side; vertical barriers determining a division of said chute into a filling chute and a discharge chute adjacent to the open side and communicating with the filling chute throughout; and downwardly and inwardly slanted separated staggered baffles secured between said side walls perpendicular thereto in vertical series to form a telegraph chute in said filling chute spaced from said slide door and extending substantially from top to bottom of the filling chute; an intermediate part of each baffle being beneath and spaced from the lower edge of the baffle just above, thereby to form a flowage space for lowering the material from said conveyor in a column from the top to the bottom of the filling chute, to the bottom, to permit the material to pile up, first beneath the chute and then in the filling chute and to overflow the baffles between the barriers into the discharge chute, as long as material is supplied by the conveyor, until the major portion of the chutes is filled.

7. A filling chute comprising walls forming three permanently closed sides and an open side; said open side being provided with opposed vertical slideway grooves; a slide door in said grooves extending approximately from top to bottom of the chute; vertical bars on the inner face of the walls to form barriers determining a division of said chute into an inner filling chute and an outer discharge chute adjacent to the open side and freely communicating with the filling chute; a telegraph in the filling chute; an outwardly and downwardly inclined apron secured to the lower part of said door; means yieldably raising said door with a sufficiently great upward force to raise said door as the material in the chutes presses on the apron.

Signed at New York, in the county of New York and State of New York, this 7th day of March A. D. 1927.

HENRY ADAMS.